(12) United States Patent
Goldstein et al.

(10) Patent No.: US 9,591,071 B2
(45) Date of Patent: Mar. 7, 2017

(54) USER LOCATION-BASED MANAGEMENT OF CONTENT PRESENTATION

(71) Applicant: Audible, Inc., Newark, NJ (US)

(72) Inventors: Douglas Scott Goldstein, Riverdale, NJ (US); Ajay Arora, New York, NY (US); Douglas Cho Hwang, New York, NY (US); Guy Ashley Story, Jr., New York, NY (US); Shirley C. Yang, New York, NY (US)

(73) Assignee: Audible, Inc., Newark, NJ (US)

( * ) Notice: Subject to any disclaimer, the term of this patent is extended or adjusted under 35 U.S.C. 154(b) by 0 days.

(21) Appl. No.: 14/724,505

(22) Filed: May 28, 2015

(65) Prior Publication Data

US 2015/0264131 A1 Sep. 17, 2015

Related U.S. Application Data

(63) Continuation of application No. 13/722,741, filed on Dec. 20, 2012, now Pat. No. 9,047,054.

(51) Int. Cl.
*G06F 3/00* (2006.01)
*H04L 29/08* (2006.01)
*G06F 3/16* (2006.01)
*H04L 29/12* (2006.01)
*H04L 29/06* (2006.01)

(52) U.S. Cl.
CPC .......... *H04L 67/1074* (2013.01); *G06F 3/165* (2013.01); *H04L 61/609* (2013.01); *H04L 65/60* (2013.01); *H04L 67/22* (2013.01)

(58) Field of Classification Search
CPC ............................... H04L 65/60; H04L 67/22
See application file for complete search history.

(56) References Cited

U.S. PATENT DOCUMENTS

| | | | |
|---|---|---|---|
| 6,330,718 B1 * | 12/2001 | Shah-Nazaroff | H04N 5/4401 348/553 |
| 7,930,762 B1 * | 4/2011 | Blair | H04N 7/163 725/135 |
| 8,261,090 B1 | 9/2012 | Matsuoka | |
| 8,813,107 B2 | 8/2014 | Higgins et al. | |
| 2002/0138263 A1 | 9/2002 | Deligne et al. | |
| 2007/0033607 A1 * | 2/2007 | Bryan | H04H 60/27 725/10 |

(Continued)

*Primary Examiner* — Omar Abdul-Ali
(74) *Attorney, Agent, or Firm* — Knobbe Martens Olson & Bear LLP

(57) ABSTRACT

Features are disclosed for managing presentation of content to improve the content consumption experience as a user moves around or when there are multiple users. Based on user positions within a content consumption location and optionally on the layout of the location, presentation of content can be adjusted. The volume of audio content may be raised or lowered based on a user's position. Audio or visual content can be paused or stopped if a user leaves the location or the user's view is obstructed. When multiple users are consuming a content item, one or more users may have priority and any adjustment may be made to first improve the experience of the priority user. In some cases, no user has priority, and adjustments may be made to improve the experience of many or all users.

21 Claims, 6 Drawing Sheets

(56) References Cited

U.S. PATENT DOCUMENTS

| | | | |
|---|---|---|---|
| 2010/0070988 A1* | 3/2010 | Cohen | G06K 9/00604 |
| | | | 725/10 |
| 2010/0070990 A1 | 3/2010 | Nagumo | |
| 2010/0103316 A1* | 4/2010 | Colsey | H04L 12/282 |
| | | | 348/552 |
| 2011/0154385 A1* | 6/2011 | Price | H04H 60/45 |
| | | | 725/12 |
| 2011/0157327 A1 | 6/2011 | Seshadri et al. | |
| 2012/0054634 A1* | 3/2012 | Stone | G06F 17/30905 |
| | | | 715/745 |
| 2014/0098116 A1* | 4/2014 | Baldwin | G06F 3/011 |
| | | | 345/522 |

* cited by examiner

USER LOCATION-BASED MANAGEMENT OF CONTENT PRESENTATION

CROSS-REFERENCE TO RELATED APPLICATION

This application is a continuation of U.S. patent application Ser. No. 13/722,741, entitled USER LOCATION-BASED MANAGEMENT OF CONTENT PRESENTATION and filed Dec. 20, 2012, the entirety of which is incorporated herein by reference.

BACKGROUND

Electronic devices may be used to consume content, such as audio books, electronic books, television shows, movies, video games and music. Purpose-built media devices, including televisions, stereos, video game systems and desktop computers provide rich content consumption experiences. The media devices can have large high definition displays, high fidelity audio processing equipment, speakers and large amounts of computing power. In addition, many media devices can be shared among multiple users. In a common scenario, a user may wish to view a movie or listen to an audio book. The user may view the movie or listen to the audio book on a purpose-built media device or collection of devices, such as a home entertainment system.

Many home entertainment systems provide wide viewing angles for televisions, and surround sound audio for use with the television, stereo system or some other media presentation device that produces audio output. The various surround sound speakers of the home entertainment system may be configured to produce an optimum or enhanced sound profile at a specific position or range of positions within a particular area, such as a room of a house. Users within the range of positions may experience the benefits of surround sound to a greater degree than users outside the range of positions. A user may use a remote control or, in some cases, a personal media device to adjust the volume and other properties of the home entertainment system in order to improve the user's content consumption experience regardless of the location of the user.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
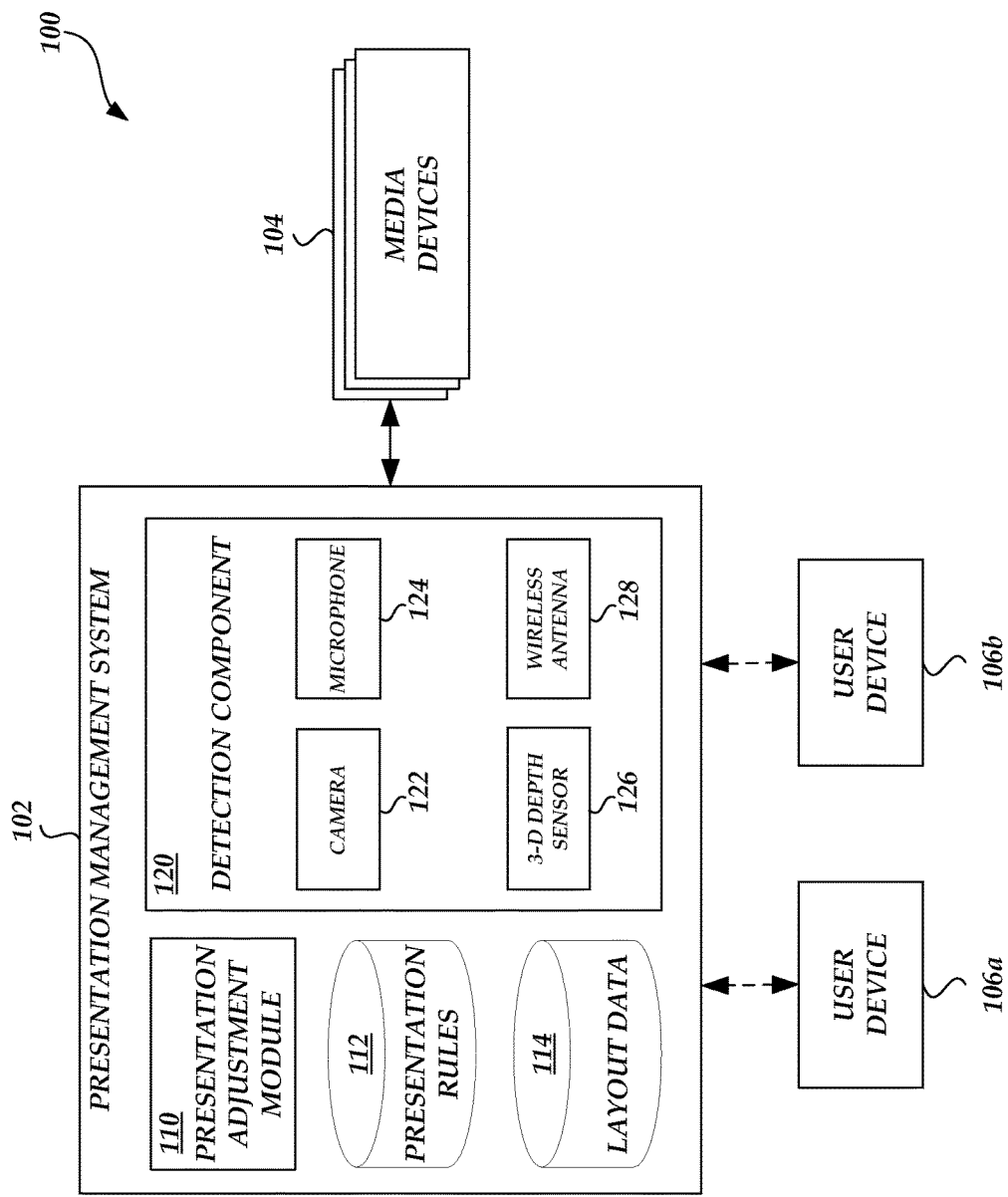
FIG. 1 is a block diagram of an illustrative content consumption environment including a presentation management system, a media device, and multiple user devices.

Generally described, the present disclosure relates to managing presentation of content to improve the content consumption experience as a user moves around or when there are multiple users. Aspects of the disclosure will be described with respect to determining a visual or acoustic layout of a content consumption location, such as a room in a house. For example, a home entertainment system may include both visual output and audio output components (e.g., a television and surround sound speakers). A user may provide or facilitate provision of room layout data to a presentation management system, which can use the room layout data to determine an acoustic or visual profile for the room, such as where in the room a television cannot be seen or where audio content may not be clearly heard.

The presentation management system may be integrated into one or more components of the home entertainment system. If the presentation management system is embodied in a separate device, the user may also provide data regarding the capabilities and technical specifications of the home entertainment system components, or such data may be automatically acquired (e.g., from a remote service accessible via a network connection). In some embodiments, rather than receiving room layout data from a user, the presentation management system may perform an automated or semi-automated process to determine the layout of the room. The presentation management system may then use the room layout data and media device specifications to determine a presentation configuration that optimizes or improves a content consumption experience of a user based on the user's position within the room.

Additional aspects of the disclosure relate to determining a user's position within a content consumption location, such as a room, and adjusting the presentation of content based on the user's location. For example, the presentation management system can cause a media device to present a content item, such as an audio book, video, video game, music file, multimedia file or some other audiovisual content. The presentation management system can track a user during content presentation through the use of a camera, or by communicating with a mobile device carried by the user (e.g., a smart phone). In some embodiments, the presentation management system may determine a user's location based on acoustic analysis of the user's voice and the data regarding the layout of the room. Once the user's location is determined, the presentation management system can utilize the acoustic or visual layout of the room to determine adjustments to the presentation of the content (e.g., raising or lowering the volume, or pausing playback if the user is unable to see the visual display). In some embodiments, the layout of the room is not used to determine an adjustment, but instead only the user's location and, optionally, the distance between the user and one or more presentation components of the media device (e.g., video screen or speakers) are used.

Further embodiments of the disclosure relate to adjusting the presentation of a content item when there are multiple users at the content consumption location. For example, one user may have priority over other users, and adjustments to the presentation of a content item may be implemented based on the location of the priority user. In another example, there may be no priority user, and the presentation management system may implement adjustments that improve the user experience of all users or the largest number of users.

Although aspects of the embodiments described in the disclosure will focus, for the purpose of illustration, on a presentation management system detecting users and adjusting the presentation of content based on user positions, one skilled in the art will appreciate that the techniques disclosed herein may be applied to any number of software processes or applications. For example, a personal mobile device of a user may determine the user's position and automatically adjust presentation of content by a media device to improve the experience at the user's current location. Various aspects of the disclosure will now be described with regard to certain examples and embodiments, which are intended to illustrate but not limit the disclosure.

With reference to an illustrative example, a user may set up a home entertainment system in the user's home. The home entertainment system may have one or more audio-visual components, such as a television, stereo and surround sound speakers. In addition, the user may implement a presentation management system. The presentation management system can control presentation of content via the home entertainment system. For example, the presentation management system can control playback of video content on the television and audio content on the stereo based on where the user is in relation to the output components of the home entertainment system.

In order to determine where the user is in relation to the output components of the home entertainment system, the presentation management system may include or have access to various detection components. For example, the presentation management system may include a camera or other sensor to determine the physical location of the user. Based on the user's current physical location and the location of the output components, the presentation management system may alter presentation of a content item. If the distance between the user and the speakers exceeds a threshold or falls within a range, the presentation management system may adjust the volume. If the user is not detected to be present (e.g., the user has left the room with the home entertainment system output components), the presentation management system may pause or stop presentation of a content item.

The presentation management system may use other techniques to determine a user's current physical location. For example, the presentation management system may indirectly track the location of a user by tracking the location of a personal user device, such as a mobile phone, that is associated with the user. The presentation management system may establish a wireless connection directly with the mobile phone, such as a Bluetooth or near-field wireless connection, to determine the user's location. In some embodiments, the presentation management system may communicate with the mobile phone via a network connection, such as a local area network ("LAN") or the Internet. The mobile phone may utilize a global positioning system ("GPS") component or some other means of determining its current physical location, and then transmit location information to the presentation management system.

In some embodiments, the user's current location is not tracked, but rather the user's experience is monitored. For example, a user may have a mobile phone. Mobile phones typically have audio input components, such as microphones. The mobile phone may execute application software that receives input from the microphone and transmits information about the quality of the input (e.g., clarity, volume) to the presentation management system. The presentation management system can use this information to adjust the presentation of the content item.

The presentation management system may also use data regarding the layout of the location in which the content is presented (e.g., the room of a house) to make finer or more targeted adjustments. For example, if the room includes various objects that may block a view of the television (e.g., partial walls), the presentation management system may pause playback of video content if the user is detected to be at a location in which such an object is between the user and the television. Layout data may also be used to adjust audio characteristics of content presentation. For example, a user may move into an adjoining room, but there may not be a door between the room in which the audio output components are located and the adjoining room. The presentation management system may increase the playback volume of a content item that is exclusively or primarily audio, such as music or an ebook.

The presentation management system may also use data regarding the features and technical specifications of the various media devices that it controls or has access to in order to manage presentation of content. For example, televisions vary widely in display size, resolution, and viewing angle. The presentation management system may use data regarding these features to determine when a user is no longer able to see video content displayed on the television even though there may not be any objects between the user and the television. If the television that is currently presenting video content has a viewing angle of 120 degrees (60 degrees from orthogonal to the plane of the display) and the user is currently located at a position that is 75 degrees from orthogonal to the plane of the display, the presentation management system may pause playback. As another example, if a television has a small, standard resolution display (e.g., a 20" television with 480p resolution), the presentation management system may pause playback when it detects the distance between the user and the television exceeds a threshold.

In many cases, multiple users may be in a room or other area consuming the content item. When two or more users wish to consume a content item on a shared media device at the same time, the presentation management system can adjust presentation of the content item so as to optimize or provide the best experience for all users or the largest number of users. For example, the presentation management system may determine the position of each of the users through the techniques described above. The presentation management system may the use the location data for the multiple users, and optionally layout data or technical specifications of the output devices, to determine whether adjustments may be made that will improve the experience of the users. In some embodiments, users may be prioritized such that adjustments are made to the presentation of a content item to improve the user experience of the highest priority user first. The prioritization may be absolute, (e.g., one user always has priority), relative (one user may have priority over another user but not over a third user) or based on dynamic factors such as the content item, user interests, and the like. For example, one user may be particularly interested in sports, while another user may be particularly interested in music. When the content item being presented is a sports-related content item, the user that is particularly interested in sports may be prioritized such that adjustments are made to improve or maintain the experience of that user first. When the content item being presented is music, the user that is particularly interested in must may be prioritized such that adjustments are made to improve or maintain the experience of that user.

Content Presentation Environment

Prior to describing embodiments of presentation management processes in detail, an example content presentation environment in which the processes may be implemented will be described. FIG. 1 illustrates a content presentation environment 100 including a presentation management system 102, any number of media devices 104 and any number of user devices 106. The presentation management system 102 may be integrated into a media device 104, or it may be a separate component.

The user devices 106 can correspond to a wide variety of electronic devices. In some embodiments, the user devices 106 are mobile devices that include one or more processors and a memory which may contain software applications executed by the processors. Illustratively, the user devices 106 may include mobile phones, personal digital assistants ("PDAs"), mobile gaming devices, media players, electronic book readers, tablet computers, laptop computers and the like. The software of the user devices 106 may include components for establishing communications over wireless communication networks or directly with other computing devices.

The media devices 104 can correspond to a wide variety of electronic devices configured present content, facilitate presentation of content or otherwise participate in the presentation of content. In some embodiments, the media devices 104 can include audio or visual output components, such as speakers or video screens. For example, the media devices 104 may include televisions, stereos, digital video recorders ("DVRs"), set-top boxes, video game systems, desktop computers, server computers and the like. In some embodiments, a media device 104 may also be a user device 106, such as a mobile media player that is optionally connected to speakers or a stereo. Some media devices 104 may include one or more processors and a storage or memory which may contain software applications executed by the processors. The software of the media devices 104 may include components for establishing communications over the a communication network. In addition, the software applications may include multimedia applications which play or otherwise execute audio programs such as music or audio books, video programs such as movies or television shows, and video games. The storage of the media devices 104 may also contain copies of content to play on the speakers or video screens. The media devices 104 may be configured to receive and/or transmit streaming media (e.g., audio and/or video content).

In some embodiments, the presentation management system 102 may communicate with the media devices 104 and/or various user devices 106a, 106b via a communication network, such as a LAN. The LAN may include one or more switches, routers, access points, modems, etc. The LAN may be or include a wireless local area network ("WLAN"). In some embodiments, the components networked to the LAN may communicate over a combination of wired and wireless communication links. Due to the mobile nature and wireless connectivity of many user devices 106, the LAN may network any number of user devices 106, and the number may change over time or from minute to minute. In some embodiments, user devices 106 may communicate with the presentation management system 102 via a personal area network ("PAN"), Bluetooth connection, or some other near-field communication link. In some embodiments the LAN may be replaced by such connections. For example, a presentation management system 102 may be capable of communicating directly with a user device 106 over near-field communication link without the need for a router, access point, or other components typically used in a LAN. Similarly, the presentation management system 102 may be in direct communication with a media device 104 via a wired (e.g., Ethernet) or wireless (e.g., Bluetooth) connection.

The presentation management system 102 illustrated in FIG. 1 may correspond to a computing device configured to manage content presentation via the media devices 104. For example, the presentation management system 102 may include one or more processors and a computer storage or memory which contains software applications executed by the processors. The services provided by the presentation management system 102 can include detecting the presence of users or user devices 106 and adjusting presentation of a content item on a media device 104 based on the presence of the users and their physically location or proximity to the media device 104. In some embodiments, the presentation management system 102 may be coupled to or integrated into a media device 104. For example, a smart television or set-top box may include a combination of software and hardware which provide the services of the presentation management system 102.

A presentation management system 102 may include a presentation adjustment module 110, a detection component 120, and various data stores such as a presentation rules data store 112 and layout data store 114. The presentation adjustment module 110 may be a software module, executable by one or more processors of a computing device associated with the presentation management system 102 and residing in a data store within the computing device. The detection component 120 may include or be in communication with any number of separate device or components that may aid in detecting the presence and location of users. For example, the detection component may include a camera 122, a microphone 124, a 3-D depth sensor 126 and a wireless antenna 128.

In operation, the detection component 120 may be used to determine the physical layout of a content consumption area, such as a room. For example, a camera may be used to visually scan a room. As another example, a microphone 124 may be used to capture an acoustic layout of a room, such as by recording audio generated at different locations during a configuration or setup procedure. A user may move about the room and generate sounds that are captured by the microphone 124. The captured sounds, along with data about the user's location when generating the sounds (e.g., as captured by the camera 122) may be used to develop an acoustic layout of the room. Data regarding the visual or acoustic layout of the room may be stored in the layout data store 124. If the presentation management system 102 is used to manage consumption of content in several areas, such as a central presentation management system 102 configured to manage presentation of media in several different rooms of a house, the layout data in the layout data store 114 may include an indicator of the corresponding room or other area to which the layout data applies.

During content presentation on a media device 104, the detection component 120 may monitor the location of the user or users, as described in detail below. The presentation adjustment module 110 may calculate or otherwise determine adjustments to make to the presentation of content in order to improve or maintain the user experience for one or more users. The presentation adjustment module 110 may use presentation rules from the presentation rules data store 112 in order to determine the adjustments. For example, if the detection component 120 detects that a user is no longer able to view a media device 104 display, the presentation rules may indicate that the content is to be paused, or the presentation rules may indicate that the volume should be increased so that the user may hear the content even though the user cannot see the visual component of the content. In some embodiments, presentation rules may be defined and stored for individual users. For example, some users may prefer that visual content is always paused when the user can no longer see the display, while others would prefer to have the volume raised if the user is within a range and able to hear the content. In addition, priority data and personal interest data that may be used in multiple-user scenarios, described in detail below, may be stored in the presentation rules data store 112.

Process for Managing Content Presentation

Figure 2:
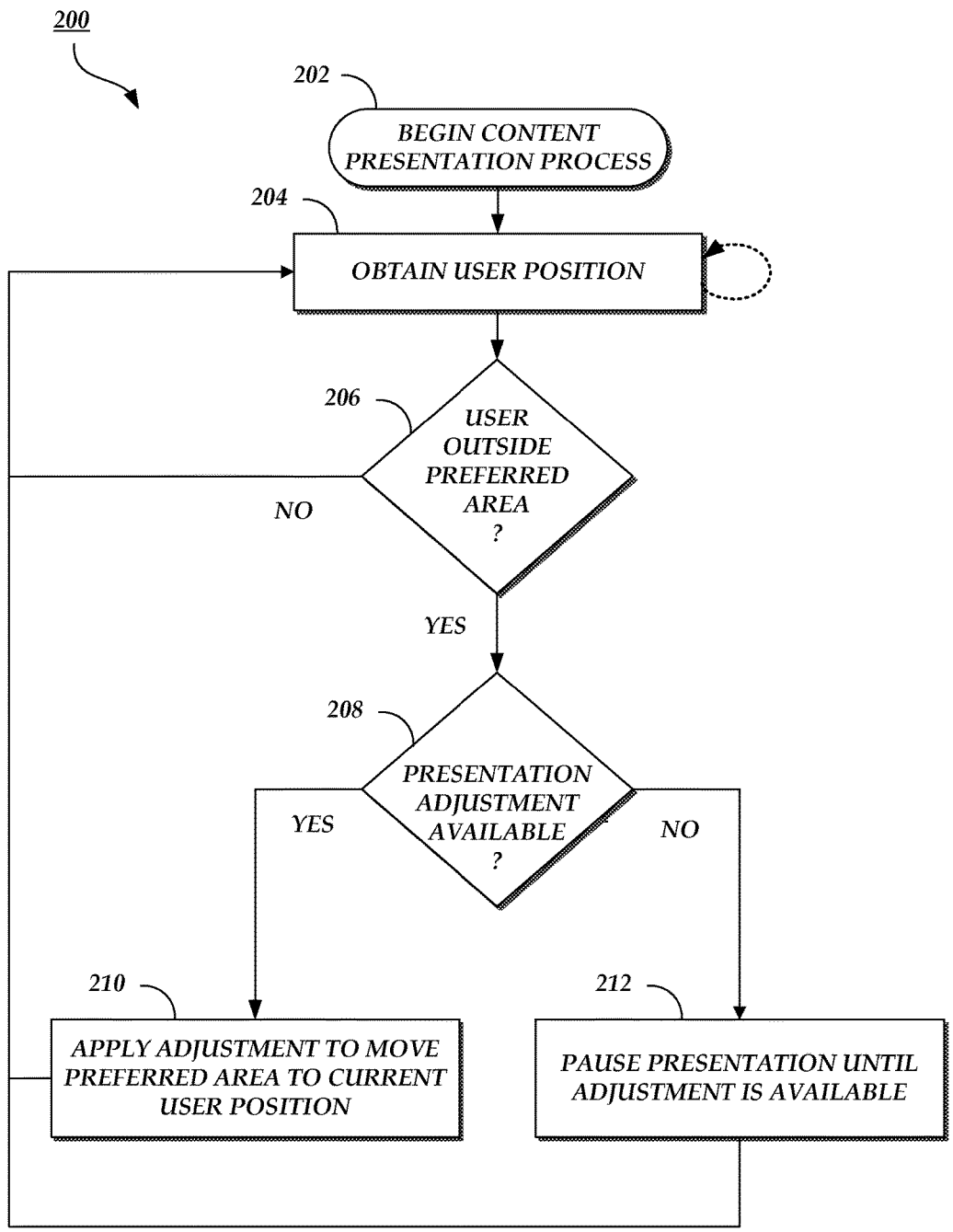
FIG. 2 is a flow diagram of an illustrative process for managing presentation of a content item to a user in variable locations within a physical range of the media device.

Turning now to FIG. 2, sample process 200 for managing the presentation of content will be described. The process 200 illustrated in FIG. 2 may be used to detect a user and determine adjustments, if any, to make to the presentation of a content item in order to improve or maintain the content consumption experience of the user. Advantageously, the process 200 may be automatically performed by a presentation management system 102, thereby obviating the need for manual processes to be performed by the user to manage presentation and make adjustments as the user moves around or through a content consumption area.

The process 200 begins at block 202. The process 200 may begin automatically upon power up, upon initiation of content presentation, or it may be manually initiated. The process 200 may be embodied in a set of executable program instructions stored on a computer-readable medium, such as one or more disk drives, of a computing system with which a presentation management system 102 is associated. When the process 200 is initiated, the executable program instructions can be loaded into memory, such as RAM, and executed by one or more processors of the computing system.

At block 204, the presentation management system 102 can obtain data regarding the physical location of a user. For example, the detection component 120 can detect the presence of one or more persons within a predetermined area, such as the expected content consumption area and possibly surrounding areas, and can include one or more cameras 122, microphones 124, 3-D depth sensors 126 and/or wireless communication antennae 128. The components of the detection component 120 can be used to collect data regarding a user within the predetermined area. The cameras 122 and/or 3-D depth sensors 126 can be used to collect facial scan data and/or body scan data of the user. The microphones 124 can be used to collect voice scan data of the user within the predetermined area, and the wireless antenna 128 can be used to detect the presence of a user device 106 within the predetermined area.

The detection component 120 can use the one or more cameras 122, 3-D depth sensors 126, and digital signal processing techniques to detect the face of a user within the predetermined area. Once detected, the detection component 120 can collect facial scan data of the user. The detection component 120 can compare the facial scan data with facial data of one or more persons that is stored within the presentation rules data store 112 or elsewhere. The stored facial data can include indications as to the identity of the user. For example, pictures or other facial information can be included as part of the information associated with an account or profile of a user. Using the stored facial data, the detection component 120 can match the facial scan data with a user profile. Presentation rules for the user may be accessed upon positive identification of the user if the user is associated with personalized rules.

Figure 3:
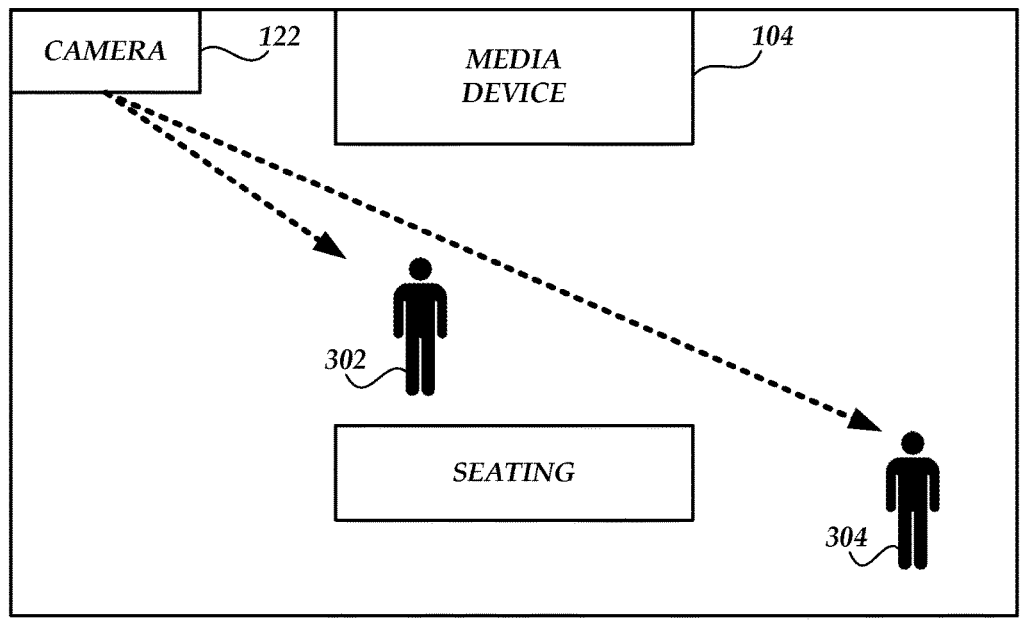
FIG. 3 is a block diagram of illustrative interactions between a user and a detection component tracking the user while a content item is presented on a media device.

FIG. 3 illustrates an example of a camera 122 scanning a room for a user. The room illustrated in FIG. 3 includes a media device 104, seating, and may also include other objects typically found in rooms or other content consumption areas. The detection component 120 may, via a camera 122 or 3-D depth sensor 126 (not pictured), detect the presence of a user at position 302. For example, as described above, the camera 122 may perform a facial scan and the detection component 120 may use facial recognition techniques to identify the user, while information about the layout of the room may be used to determine that the user is currently at position 302. In some embodiments, the identities of specific users are not important (e.g., when there are no personalized presentation rules). In such cases, the camera 122 may be used to simply detect the presence and identify the physical location with in the room of any person. In some embodiments, the detection component 120 may be configured to ignore the presence of pets, children, etc.

In some embodiments, the detection component 120 can use one or more microphones 124 and digital signal processing techniques to detect the voice of a user within the predetermined area. Upon detecting the voice of a user, the detection component 120 can collect voice scan data of the user. The voice scan data can be compared with one or more voice samples stored within the presentation rules data store 112 or elsewhere. The samples can be from different users of the presentation management device 102. Further, the voice samples can be part of the information associated with an account or profile belonging to the user. The detection component 120 can compare the stored voice samples with the voice scan data. If the detection component 120 matches the voice scan data with a voice sample of a user, any presentation rules associated with the user may also be accessed. Two or more microphones 124 may be used to triangulate or otherwise determine the position of the user within the room. In some cases, the microphone 124 may be used in conjunction with a camera 122 or 3-D depth sensor 126 to determine the position of the user.

In some embodiments, the detection component 120 can use a wireless antenna 128 or a network interface (not pictured) to detect a user device 106 that is associated with a user. The wireless antenna 128 can communicate with the user device 106 using a variety of communication standards, such as, but not limited to, Bluetooth, Wi-Fi, WiMax, RFID, short wavelength radio, mobile telecommunication standards, etc. In some embodiments, the user device 106 can provide location data to the detection component 120. If the detection component 120 determines that the user device 106 is associated with a particular user, any presentation rules associated with the user may be accessed.

Figure 4:
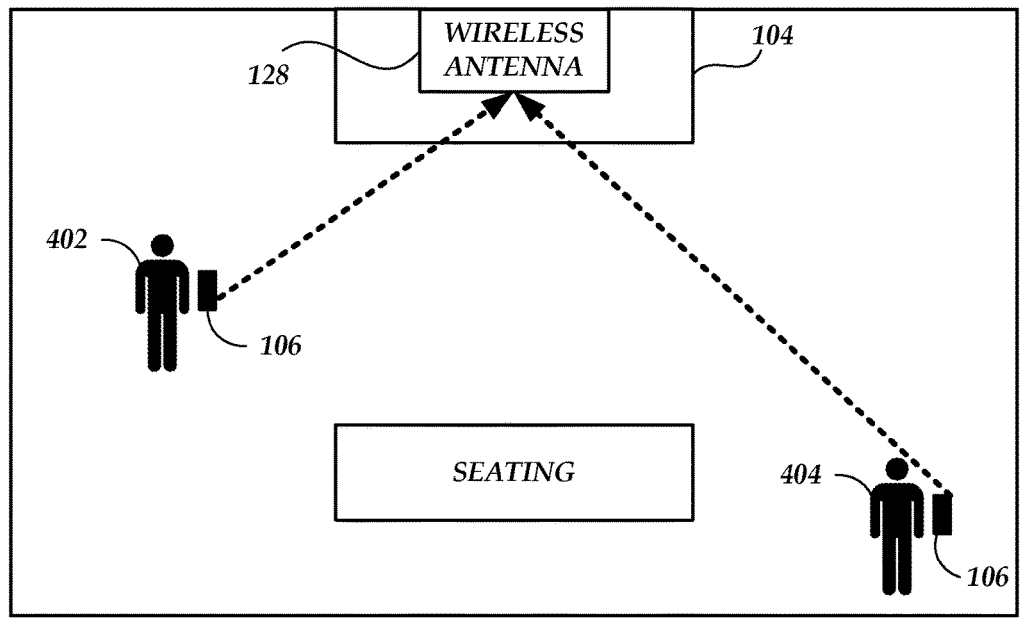
FIG. 4 is a block diagram of illustrative interactions between a user with a user device and a detection component tracking the user while a content item is presented on a media device.

FIG. 4 illustrates one example of a wireless antenna 128 establishing communications with a user device 106 at various locations 402, 404. Through such communications, the detection component 120 may indirectly detect the presence of a user. In addition, the detection component 120 may collect location data from the user device 106. For example, the user device 106 may utilize GPS components to determine its physical location, and data regarding the physical location may be transmitted to detection component 120 via the wireless antenna 128.

It will be understood that the detection component 120 can use any one or a combination of the techniques described above, or other techniques, to determine the presence and physical location of a user. In some embodiments, the detection component 120 can detect the user device 106 of a user when the user device 106 enters the predetermined area. Following the detection of the user device 106, the detection component 120 can perform a facial scan, voice scan, and/or body scan of the user to improve the accuracy of the detection. For example, the detection component 120 may detect a user device 106 associated with a particular user, but following a facial, voice, or body scan determine that the user within the predetermined area is a different user. The presentation management system 102 may then access the appropriate presentation rules, if any, for the user.

Returning to FIG. 2, at decision block 206 the presentation management system 102 can determine whether a user is outside an area in which to best consume the content, also known as a preferred consumption area. The preferred consumption area may be the area in which visual and/or audio component of a content item are best consumed. For example, visual components of a content item are typically best consumed when a user is relatively close to a visual display, such as a TV, and within the optimal or preferred viewing angle of the TV. TVs with larger screens may have large preferred consumption areas, thereby allowing users to be farther away from the TV and still be within the preferred consumption area. Audio components of a content item are typically best consumed when in close proximity to one or more speakers, depending on the volume at which content is being played through the speaker(s). Surround sound systems that include 5, 6, 7 or more speakers may generate a preferred consumption area that is not necessarily in close proximity to any one of the speakers, but may be in a centralized position between or among the various speakers.

In some embodiments, the presentation management system 102 does not determine or consider a preferred consumption area. Rather, the presentation management system may determine or consider the user's current location and/or the distance between the user and one or more media devices 104 or presentation components (e.g., speakers, video displays) associated with a media device 104.

Figure 5:
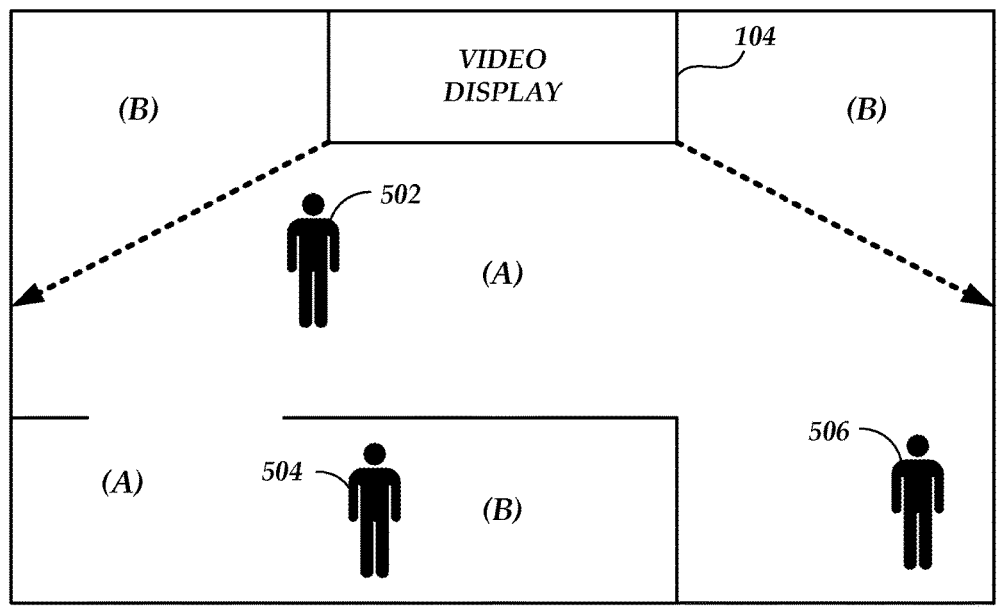
FIG. 5 is a block diagram of illustrative viewing ranges for a media device presenting visual content.

FIG. 5 illustrates an example room including a media device 104 with a video display, such as a TV. A user within the viewing angle of the TV and relatively close to the TV, such as a user at position 502, may be considered to be within the preferred consumption area (A). If the user has left the room or moved behind a partial wall that obstructs the view of the TV, such as at position 504, the user may be considered to be in an area (B) that is out of the preferred consumption area. If the user is at or has moved to a position that is within the viewing angle of the TV but relatively far away from the TV, such as position 506, the user may or may not be considered to be within the preferred consumption area (A). For example, if the TV has a small display or a low resolution display, then the user may not be considered to be within the preferred consumption area (A) when the user is at position 506. However, if the user is associated with presentation rules which state that the user can see the TV adequately from a far distance, then the particular location 506 may be considered to be within the preferred consumption area (A) for that user.

Figure 6:
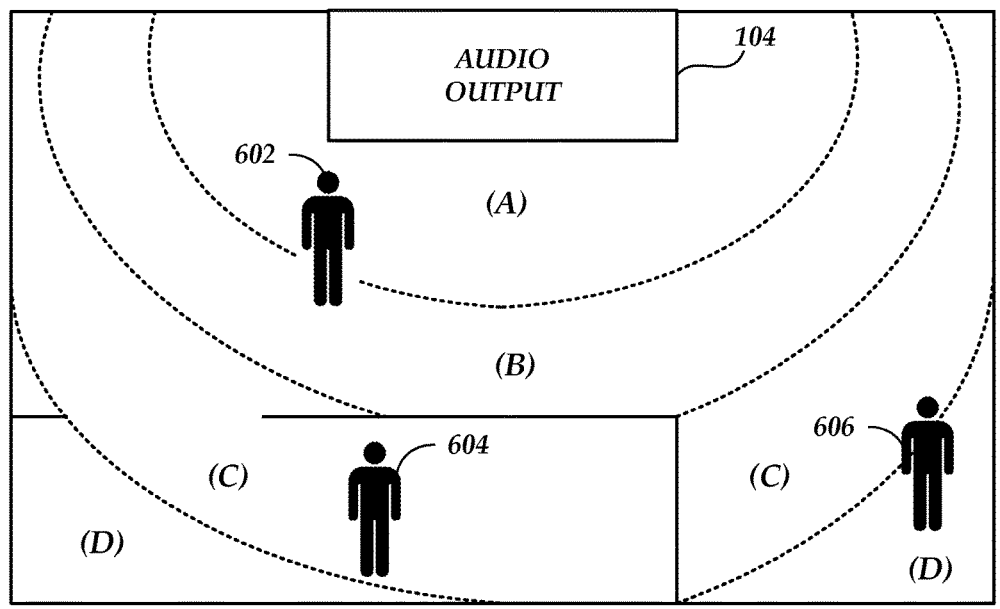
FIG. 6 is a block diagram of illustrative listening ranges for a media device presenting audio content.

Audio content may have different preferred consumption areas than visual content. In addition, content with both audio and visual components may have multiple preferred consumption areas: one for the visual component, as described above with respect to FIG. 5, and one for the audio component. FIG. 6 illustrates an example room including a media device 104 with an audio output, such as a stereo or a TV. A user within a particular range of the media device 104, such as the user at location 602 within area (A), may be able to adequately hear the content item at a first volume level. Other locations, such as location 604 in area (C) or location 606 in area (D), are not within the preferred consumption area (A) for the first volume level. However, at a second volume level, such a volume level that is much higher than the first volume level, the area (C) or the area (D) may be the preferred consumption area. Moreover, the location 602 in area (A) is not within the preferred consumption area when the volume is at the second volume level because that volume level may be much too high for a user so close to the media device 104. Also, as seen in FIG. 5, a user may still be within a preferred consumption range even if the user is another room or behind a partial wall, as the location 604, if the volume is at an appropriate level for the distance to the location 604 and any obstacles in the way.

Therefore, as seen in FIGS. 5 and 6, the physical location of a user may be detected using the techniques described above and, depending upon the current presentation parameters of the media device 104, the user may be determined to be within or outside of a current preferred consumption area. If the user is detected to be within the preferred consumption area (or at a satisfactory location or distance from the media device 104), the process 200 returns to block 204. At block 204, the detection component 120 or some other component of the presentation management system 102 may resume or continue monitoring of the user's physical location. Otherwise, if the user is detected to be outside of the preferred consumption area (or at an unsatisfactory location or distance from the media device 104), the process 200 proceeds to decision block 208. Note that if there are multiple users, the process described below with respect to FIG. 8 may be used.

The various areas (A) and (B) illustrated in FIG. 5, and areas (A), (B), (C) and (D) illustrated in FIG. 6, along with which presentation parameters, if any, make the each area the preferred consumption area, may be determined by analyzing layout data for the room. As described above, the layout data may originally be created by a user or by some automated process at the time the presentation management system 102 is implemented or installed. In some embodiments, the layout data may be generated dynamically during each execution of the process 200, or on a regular or irregular basis. The layout data may indicate which obstacles may block a user's view of the media device 104, how large the room or other content consumption area is, and so on. The particular presentation parameters to alter which area is the preferred consumption area may be universal among all users, or may be specified on a user-by-user or group basis.

At decision block 208, the presentation adjustment module 110 or some other module or component of the presentation management system 102 may determine whether an adjustment may be made to the presentation parameters of the media device 104 such that the user will be within the preferred consumption area. With reference to FIG. 6, the user may be detected at location 606, while the preferred presentation area may be area (B). The presentation adjustment module 110 may determine that a change in the volume of the media device 104 will move the preferred consumption area to area (D), bringing location 606 within the preferred consumption area. The particular change in the volume may be calculated as a function of the distance between the user and the media device 104 or an output component associated therewith. In some embodiments, the change in the volume may be based on features or technical specifications of the media device 104 or an output component associated therewith.

Figure 7A:
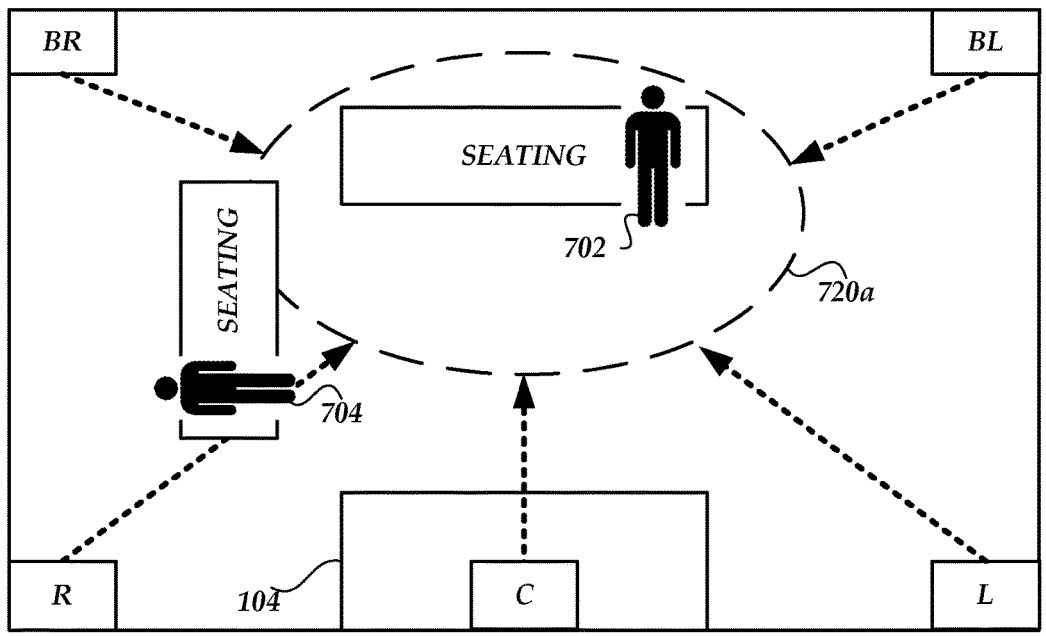
FIGS. 7A and 7B are block diagrams of illustrative audio ranges and adjustments thereto based on user positions.
Figure 7B:
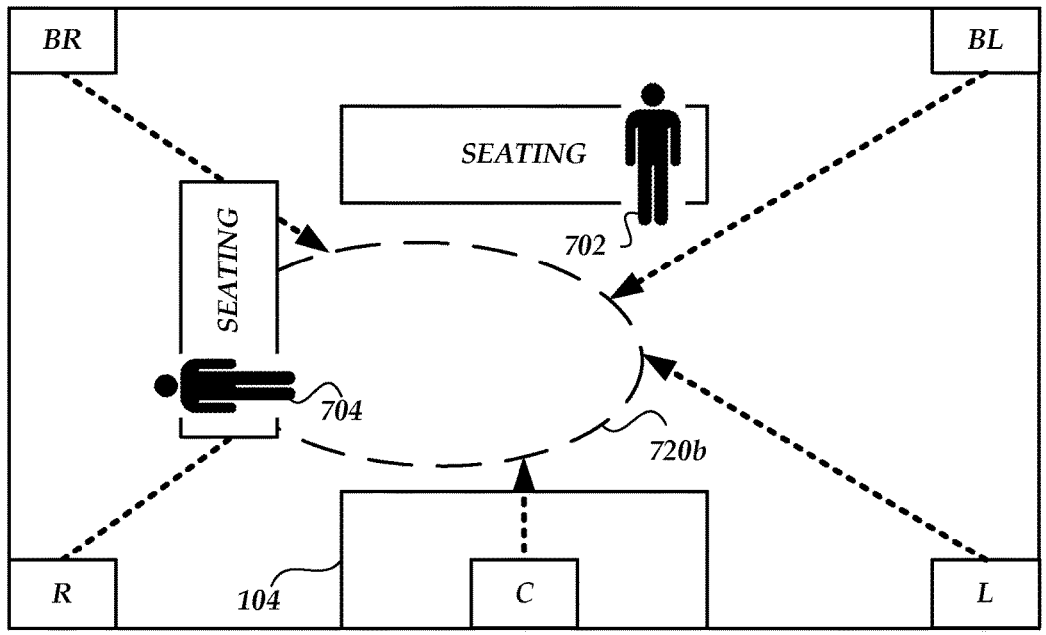

FIGS. 7A and 7B illustrate an example of modifying presentation parameters of a media device 104 to bring a user within a preferred consumption area. As seen in FIG. 7A, if the user is at position 702 and the preferred presentation area is 720a, then the user may be determined to be within the preferred presentation area 720a. However, if the user were to move to another position, such as position 704, then the user would not be determined to be within the preferred presentation area 720a. In such a case, the presentation adjustment module 110 may calculate or otherwise determine an adjustment to the presentation parameters of the media device 104 to move or enlarge the preferred presentation area 720a to include location 704. FIG. 7B illustrates the result of such an adjustment. As seen in FIG. 7B, the updated preferred presentation area 720b now includes position 704. However, the updated preferred presentation area will not include the user if the user were to return to position 702.

The adjustment to move the preferred presentation area 720a to its new location and shape 720b may be calculated based on layout data of the room and the features provided by the media device 104. The media device 104 in FIGS. 7A and 7B includes surround sound speakers at various locations around the room. For example, the surround sound system may include the left-front, center, right-front, left-rear and right-rear speakers shown in FIGS. 7A and 7B. By altering the output of the individual speakers, the optimal or preferred location to hear the sound produced by the media device (e.g., the preferred consumption area) may be changed. In a typical implementation, surround sound speakers may be configured so as to provide a preferred consumption area centered on seating that is directly in front of a media device 104 with which the surround sound speakers are associated, such as a TV. When a user moves to a location 704 that is at a different seating location, the output of the surround sound speakers may be altered (e.g., the sound of speakers farthest away from the new location 704 may be increased, while the sound of the speakers closest to the new location 704 may be decreased, and so on). In this way, the preferred consumption area 720b for audio may be shaped to include the current location 704 of the user, as seen in FIG. 7B, even though the audio components are typically configured to provide the best user experience at a different location 720a, as seen in FIG. 7A.

As described above with respect to FIG. 5, the preferred consumption area for a video component of the content item may be different than the preferred consumption area of an audio component of the content item. If a user is outside the room or an obstacle is between the user and the video display of the media device 104, then an adjustment to the presentation parameters of the media device 104 to include the user's location in the preferred consumption area may not be reasonably possible. In such cases, the presentation adjustment module 110 may determine that there is no adjustment that will create a preferred consumption area that includes the user. An example exception may be if the user is associated with a presentation rule that the user need not see content items of the current type, at the current time, or at all.

With continuing reference to decision block 208 of FIG. 2, if the presentation adjustment module 110 determines that an adjustment to the presentation parameters will move or create a preferred presentation area that includes the user's current physical location, then the process 200 can proceed to block 210 where the adjustment is applied. The detection component 120 or some other component of or associated with the presentation management system 102 may continue to monitor the user's position to determine if further adjustments become necessary.

If the presentation adjustment module 110 determines that an adjustment is not available to create a preferred consumption area that includes the user, then the process 200 proceeds to block 212. At block 212, the presentation management system 102 may pause or stop presentation of the content item. Presentation may be paused or stopped until such time as the user is detected to be within the current preferred area, or the user has moved to a position where an adjustment may be made to position the preferred consumption area such that it includes the user's new physical location.

Figure 8:
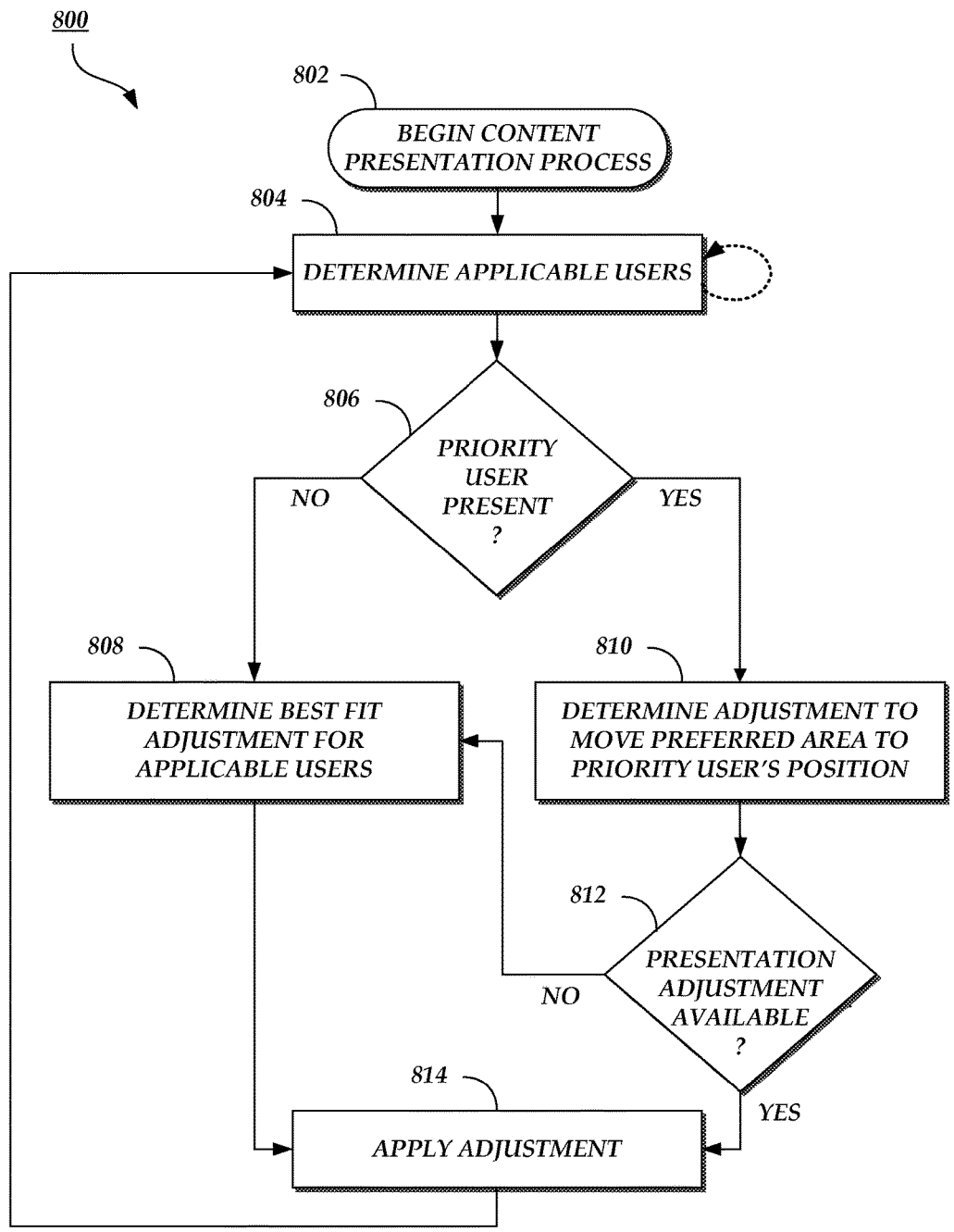
FIG. 8 is a flow diagram of an illustrative process for managing presentation of a content item to multiple users in variable locations within a range of the media device.

Turning now to FIG. 8, sample process 800 for managing the presentation of content to multiple users will be described. The process 800 illustrated in FIG. 8 may be used to detect and identify multiple users and their physical locations, and determine adjustments, if any, to make to the presentation of a content item in order to improve or maintain the content consumption experience of the users or a subset thereof. Advantageously, the process 800 may be automatically performed by a presentation management system 102, thereby removing the need for manual processes to be performed by users to manage presentation and make adjustments based on user priority, different locations and the like.

The process 800 begins at block 802. The process 800 may begin automatically upon power up, upon initiation of content presentation, or it may be manually initiated. The process 800 may be embodied in a set of executable program instructions stored on a computer-readable medium, such as one or more disk drives, of a computing system with which a presentation management system 102 is associated. When the process 800 is initiated, the executable program instructions can be loaded into memory, such as RAM, and executed by one or more processors of the computing system.

At block 804, the presentation management system 102 can determine which users are present. In some cases, multiple persons and/or animals may be detected, but only a subset thereof may participate in the consumption of a content item. For example, children and pets may be present and may move throughout the room or other consumption area, but their presence is not considered when determining presentation parameters. In other cases, some or all children may participate in the content consumption session or should otherwise be considered when determine presentation parameters. Methods for detecting the presence of children and pets and for distinguishing between adults, children and pets are described in detail in U.S. patent application Ser. No. 13/720,929, filed on Dec. 19, 2012, the contents of which are hereby incorporated by reference. In addition to determining the applicable users, detection component 120 or some other component of the presentation management system 102 may determine physical locations for each user, as described in detail above.

At decision block 806, the presentation management system 102 may determine whether one or more of the users has priority over other users. Data regarding priority may be accessed in the presentation rules data store 114 or elsewhere. Priority may be used to ensure that presentation parameters are used to improve or maintain the experience of the user with the highest priority. For example, a parent may have priority over a child, a child may have priority over another child, and so on. Such priority rankings may be absolute; for as long as the child lives with the parent, the parent may have priority over the child. In some embodiments, priority may be dependent upon various factors such that one user may not necessarily have priority over another user in every situation. For example, data regarding user interests may be accessed. The data may have been entered by the users or detected over the course of time and multiple content consumption sessions. One user may be interested in sports events, while a second user may not be interested in sports but may instead be interested in audio books. When the content item being presented is a sports event, the first user may have priority over the second user, while the second user may have priority over the first when the content item is an audio book. In some cases, none of the users present may have priority.

If no user has priority, the process can proceed to block 808, where an adjustment to the presentation parameters is determined based upon its applicability to all users. For example, if the users are spread across a wide range of locations, the presentation parameters of the media device 104 (e.g., absolute volume or relative speaker output) may be adjusted to provide the largest preferred consumption area or the best fit among all users, even if the quality or consistency of presentation across the entire preferred consumption area varies (e.g., there may be hot spots or dead spots).

FIG. 6 illustrates several different physical positions 602, 604, 606 with respect to an audio output media device 104. The presentation management system 102 can detect multiple users at different positions, such as a first user at position 602, within area (A), and a second user at position 604, within area (C). The presentation management system 102 can attempt to create a satisfactory experience for both users without prioritizing one user over the other. For example, the presentation management system 102 may determine that volume X (where X is some metric for measuring or setting volume) is optimal or preferred for users in area (A), such as the user at position 602. A volume level of Z may be optimal or preferred for users in area (C), such as the user at position 604. In an effort to accommodate both users, the presentation management system 102 may determine that volume Y should be used because volume Y may be the optimal or preferred volume for users in between areas (A) and (C), such as users in area (B). As another example, the presentation management system 102 may determine that an average of volumes X and Z should be used (e.g., (X+Z)/2). Similar determinations may be made based on the positions of three or more users. In some cases, it may not be possible to provide a satisfactory experience to a user at a particular location. For example, if a user at position 606, in area (D), cannot hear the content presented by the media device 104 regardless of which volume level the media device 104 is using, then the presentation management system 102 can exclude that user from the determination described above. Similar techniques may be used to determine presentation parameters for visual content.

Returning to decision block 806, if a user does have priority, the process 800 can proceed to block 810. At block 810, an adjustment may be calculated or otherwise determined which provides the priority user with the best consumption experience possible under the present conditions (e.g., the preferred presentation area is centered on the priority user). In some embodiments, other users may be considered when determining presentation parameters, such that the user experience of the priority user is weighted most heavily but adjustments and parameters are chosen to provide a preferred consumption area that also includes many other users. In some cases, an adjustment to the presentation parameters that positions the preferred consumption area around or near the priority user is not able to be calculated or determined. In such cases, the process 800 may continue to calculate the adjustment that provides the priority user with the best experience possible. Alternatively, the process 800 may proceed to block 808, described above, in order to determine a best fit for the group of multiple users.

At block 814, the adjustments determined in block 808 or 810 may be implemented. The process 800 may return to block 804 in order to continue to monitor for new users, users that may have left, and the locations of each present user.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    a data store configured to store computer-executable instructions and presentation rules; and
    a computing device in communication with the data store, the computing device, when executing the computer-executable instructions, configured to at least:
        transmit, to a media device, a first instruction to begin presentation of a content item;
        detect a first physical position of a first user within a content consumption area and a second physical position of a second user within the content consumption area;
        obtain a presentation rule from the data store;
        determine a first priority between the first user and the second user, based at least in part on:
            the presentation rule,
            an identity of the first user,
            the first physical position of the first user,
            an identity of the second user, and the second physical position of the second user;
        determine a presentation parameter based at least in part on the first physical position of the first user, the second physical position of the second user, and the first priority; and
        transmit, to the media device, a second instruction to apply the presentation parameter to the presentation of the content item.

2. The system of claim 1, wherein the presentation rule includes at least a content item preference of the first user, and wherein the computing device, when executing the computer-executable instructions, is further configured to at least:
    determine that the content item satisfies a condition associated with the content item preference of the first user,
    wherein the computing device configured to at least determine the first priority is further configured to determine the first priority based at least in part on determining that the content item satisfies the condition associated with the content item preference of the first user.

3. The system of claim 1, wherein the presentation rule includes at least a content category preference of the first user, and wherein the computing device, when executing the computer-executable instructions, is further configured to at least:
    identify a content category of the content item presented via the media device; and
    determine that the content category of the content item satisfies a condition associated with the content category preference of the first user,
    wherein the computing device configured to at least determine the first priority is further configured to determine the first priority based at least in part on determining that the content category of the content item satisfies the condition associated with the content category preference of the first user.

4. The system of claim 1, wherein the presentation rule includes at least a set of user rankings, and wherein the computing device, when executing the computer-executable instructions, is further configured to at least:
    identify, from the set of user rankings, a ranking of the first user and a ranking of the second user,
    wherein is the computing device configured to at least determine the first priority is further configured to determine the first priority based at least in part on identifying the ranking of the first user and the ranking of the second user.

5. The system of claim 1, wherein the presentation rule includes at least a consumption range preference of the second user, and wherein the computing device, when executing the computer-executable instructions, is further configured to at least:
    determine that the second physical position of the second user is outside the consumption range preference of the second user,
    wherein the computing device configured to at least determine the first priority is further configured to determine the first priority based at least in part on determining that the second physical position of the second user is outside the consumption range preference of the second user.

6. The system of claim 1, wherein the presentation rule includes at least a presentation range associated with the media device, and wherein the computing device, when executing the computer-executable instructions, is further configured to at least:
    determine that the second physical position of the second user is outside the presentation range associated with the media device,
    wherein the computing device configured to at least determine the first priority is further configured to determine the first priority based at least in part on the determination that the second physical position of the second user is outside the presentation range associated with the media device.

7. A computer-implemented method under control of a computing device configured with specific computer-executable instructions, the computer-implemented method comprising:
- transmitting a first instruction to a media device, the first instruction causing the media device to begin presentation of a content item;
- detecting a first user at a first physical position within a content consumption area and a second user at a second physical position within the content consumption area;
- obtaining a presentation rule;
- determining, based at least in part on the presentation rule, a first priority between the first user and the second user;
- determining a presentation parameter based at least in part on detecting the first user at the first physical position, detecting the second user at the second physical position, and determining the first priority; and
- transmitting a second instruction to the media device, the second instruction causing the media device to apply the presentation parameter to the presentation of the content item.

8. The computer-implemented method of claim 7, wherein determining the presentation parameter comprises:
- determining a current consumption area associated with the media device; and
- calculating a parameter that causes the current consumption area to surround the first physical position at which the first user is detected.

9. The computer-implemented method of claim 8, wherein the parameter that causes the current consumption area to surround the first physical position at which the first user is detected further causes the current consumption area to include the second physical position at which the second user is detected.

10. The computer-implemented method of claim 8, wherein determining the current consumption area associated with the media device is based at least in part on identifying a category associated with the content item, wherein the category comprises at least one of an audio book, video, video game, music file, or multimedia file.

11. The computer-implemented method of claim 7, wherein determining the presentation parameter comprises:
- determining an intermediate physical position based at least in part on detecting the first user at the first physical position, detecting the second user at the second physical position, and determining the first priority; and
- calculating a parameter based at least in part on determining the intermediate physical position.

12. The computer-implemented method of claim 7, wherein determining the presentation parameter comprises:
- determining a first parameter based at least in part on the first physical position at which the first user is detected;
- determining a second parameter based at least in part on the second physical position at which the second user is detected;
- obtaining a first weighting factor associated with the first user and a second weighting factor associated with the second user, the first weighting factor and the second weighting factor based at least in part on the first priority; and
- calculating a weighted parameter based at least in part on applying the first weighting factor to the first parameter and applying the second weighting factor to the second parameter.

13. The computer-implemented method of claim 7 further comprising detecting a third user at a third physical position within the content consumption area, determining a second priority between the second user and the third user, and determining a third priority between the first user and the third user, wherein determining the presentation parameter is further based at least in part on determining the second priority, determining the third priority, and detecting the third user at the third physical position.

14. The computer-implemented method of claim 13, wherein determining the presentation parameter comprises:
- identifying a current consumption area associated with the media device; and
- calculating a parameter that causes the current consumption area to include at least the first physical position at which the first user is detected, the second physical position at which the second user is detected, and the third physical position at which the third user is detected.

15. The computer-implemented method of claim 14, wherein the first priority indicates that the first user has priority over the second user, wherein the third priority indicates that the first user has priority over the third user, and wherein the current consumption area surrounds the first physical position at which the first user is detected.

16. The computer-implemented method of claim 13, wherein the third priority indicates that the first user has priority over the third user, wherein the second priority indicates that the second user has priority over the third user, and wherein determining the presentation parameter comprises:
- identifying a current consumption area associated with the media device; and
- calculating a parameter that causes the current consumption area to include at least the first physical position at which the first user detected and the second physical position at which the second user is detected.

17. A non-transitory computer readable medium comprising executable code that, when executed by a processor, causes a computing device to perform operations comprising:
- detecting a first user at a first physical position within a content consumption area and a second user at a second physical position within the content consumption area;
- determining, based at least in part on detecting the first user at the first physical position and detecting the second user at the second physical position, a first priority between the first user and the second user;
- determining a presentation parameter for a media device presenting a content item, wherein determining the presentation parameter is based at least in part on detecting the first user at the first physical position, detecting the second user at the second physical position, and determining the first priority; and
- transmitting an instruction to the media device, the instruction causing the media device to apply the presentation parameter to the presentation of the content item.

18. The non-transitory computer readable medium of claim 17, wherein determining the first priority comprises determining a preference of the first user for the content item, wherein determining the preference of the first user for the content item is based at least in part on detecting previous activity by the first user.

19. The non-transitory computer readable medium of claim 18, wherein the previous activity by the first user includes at least one of:

consumption of the content item;
consumption of a related content item; or
consumption of content in a category corresponding to the content item.

20. The non-transitory computer readable medium of claim 17, wherein determining the first priority comprises detecting that the second user is a minor, and wherein the first priority indicates that the first user has priority over the second user.

21. The non-transitory computer readable medium of claim 17, wherein determining the first priority comprises determining that the first physical position at which the first user is detected is outside a presentation area associated with the media device, and wherein transmitting the instruction causes the media device to pause presentation of the content item.

* * * * *

UNITED STATES PATENT AND TRADEMARK OFFICE
CERTIFICATE OF CORRECTION

PATENT NO. : 9,591,071 B2
APPLICATION NO. : 14/724505
DATED : March 7, 2017
INVENTOR(S) : Douglas Scott Goldstein et al.

It is certified that error appears in the above-identified patent and that said Letters Patent is hereby corrected as shown below:

In the Specification

In Column 5 at Line 46, change "the a" to --a--.

In Column 16 at Line 34 (approx.), In Claim 4, change "wherein is the computing device configured to at least" to --wherein the computing device is configured to at least--.

In the Claims

In Column 18 at Line 36, In Claim 16, after "user" insert --is--.

Signed and Sealed this
Twenty-fourth Day of April, 2018

Andrei Iancu
*Director of the United States Patent and Trademark Office*